United States Patent [19]

Matama et al.

[11] Patent Number: 4,893,178
[45] Date of Patent: Jan. 9, 1990

[54] SIMULATOR FOR AUTOMATIC PHOTOGRAPHIC PRINTING APPARATUS INCLUDING INVERSION CIRCUITRY AND SPECTRAL CHARACTERISTIC COMPENSATION

[75] Inventors: Toru Matama; Kenji Suzuki; Koji Takahashi; Tsuneo Suzuki, all of Kanagawa, Japan

[73] Assignee: Fuji Photo Film Co., Ltd., Kanagawa, Japan

[21] Appl. No.: 78,956

[22] Filed: Jul. 29, 1987

[30] Foreign Application Priority Data

| Jul. 29, 1986 | [JP] | Japan | 61-178293 |
| Sep. 3, 1986 | [JP] | Japan | 61-207564 |
| Sep. 26, 1986 | [JP] | Japan | 61-227377 |
| Jun. 18, 1987 | [JP] | Japan | 62-152161 |

[51] Int. Cl.$^4$ .............................................. G03F 3/08
[52] U.S. Cl. ............................................. 358/76; 358/80
[58] Field of Search ........................................ 358/76, 80

[56] References Cited

U.S. PATENT DOCUMENTS

| 3,800,071 | 3/1974 | Reeber | 358/76 |
| 4,097,892 | 6/1978 | Balding | 358/76 |
| 4,340,905 | 7/1982 | Balding | 358/80 |
| 4,349,835 | 9/1982 | Horiguchi et al. | 358/76 |
| 4,736,244 | 4/1988 | Shiota et al. | 358/76 |
| 4,736,245 | 4/1988 | Seto et al. | 358/76 |
| 4,782,390 | 11/1988 | Hayashi et al. | 358/76 |
| 4,797,712 | 1/1989 | Hayashi et al. | 358/76 |
| 4,812,879 | 3/1989 | Suzuki | 358/76 |
| 4,839,721 | 6/1989 | Abdulwahab et al. | 358/80 |

FOREIGN PATENT DOCUMENTS

| 0054848 | 6/1982 | European Pat. Off. |  |
| 0173032 | 3/1986 | European Pat. Off. |  |
| 42-25220 | 12/1967 | Japan . |  |
| 53-46731 | 4/1978 | Japan . |  |
| 58-181381 | 10/1983 | Japan | 358/76 |
| 60-20694 | 2/1985 | Japan | 358/76 |

Primary Examiner—James J. Groody
Assistant Examiner—Randall S. Svihla
Attorney, Agent, or Firm—Sughrue, Mion, Zinn, Macpeak & Seas

[57] ABSTRACT

A simulator for use in an automatic photographic printing apparatus of the type in which a negative image carried by a color negative film is printed on a photographic paper by a light source system which is under an automatic exposure control, the simulator having a CRT for displaying a positive image corresponding to the negative image. The simulator includes an inversion circuit for inverting the output from an image pickup device for picking up the image of the negative image, thus enabling the positive image corresponding to the negative image to be obtained, a first conversion circuit connected to the input of the inversion circuit and adapted for effecting a compensation for any difference between the integrated density of the negative image relative to the spectral sensitivity of the image pickup device and the integrated density of the negative image relative to the spectral sensitivity of the photographic paper, and a second conversion circuit connected to the output of the inversion circuit and adapted for substantially equalizing first tristimulus values according to the emission spectral characteristics of the fluorescent substance on the CRT means and second tristimulus values according to dye absorption characteristics of the print. In consequence, a positive image which is the same as the image to be obtained by the print is automatically displayed on the CRT with a high degree of accuracy.

18 Claims, 3 Drawing Sheets

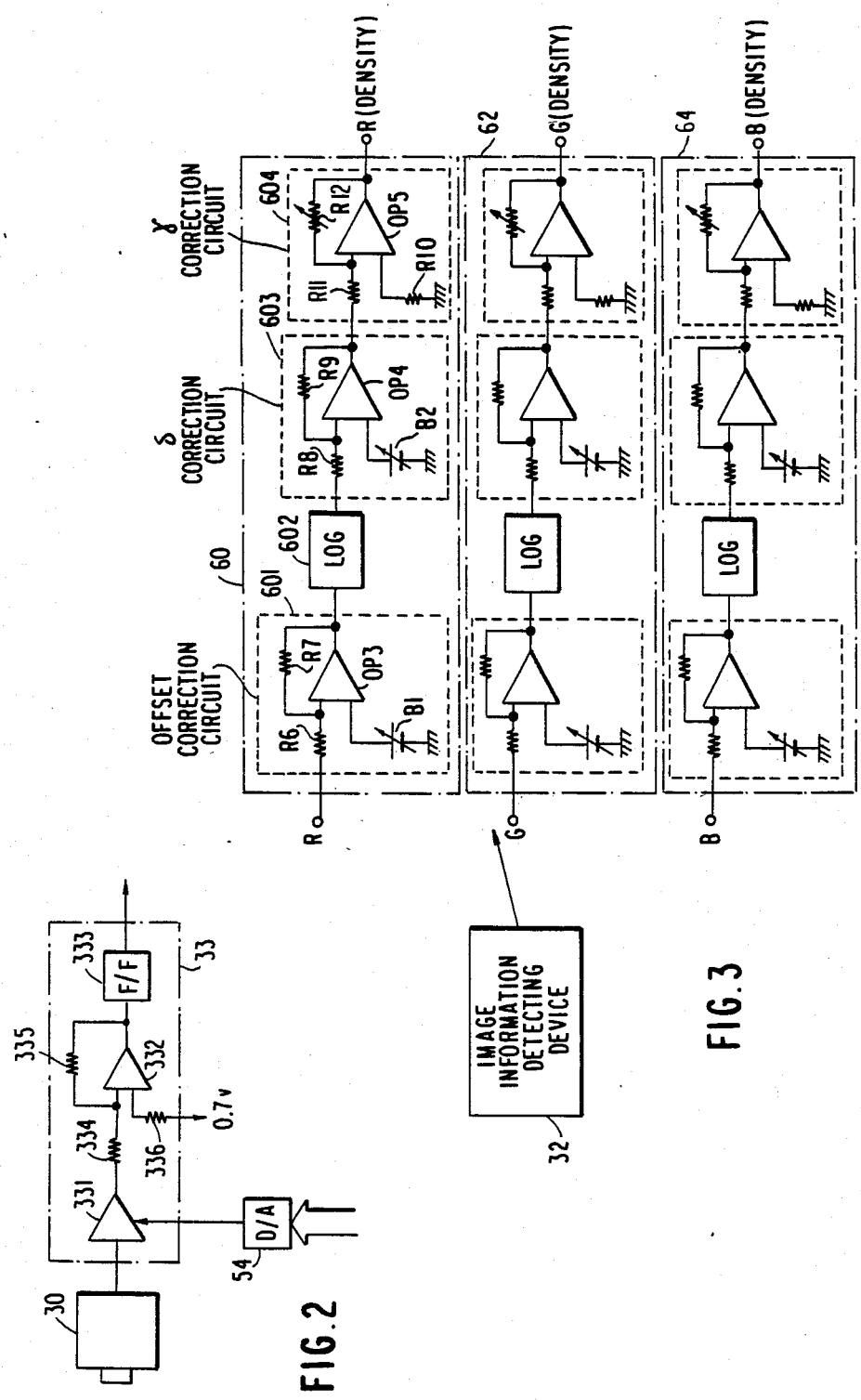

SIMULATOR FOR AUTOMATIC PHOTOGRAPHIC PRINTING APPARATUS INCLUDING INVERSION CIRCUITRY AND SPECTRAL CHARACTERISTIC COMPENSATION

BACKGROUND OF THE INVENTION

The present invention relates to a simulator for automatic printing apparatus and, more particularly, to a simulator for automatic photographic color printing apparatus which is adapted to produce, from a negative film as same image as that which will be printed on a photographic paper by an automatic photographic printing apparatus, and for displaying the thus produced image on a CRT.

Automatic photographic color printing apparatuses have been known in which a negative color film is printed and then developed such that all of the print copies have same photographic density and color balance irrespective of the density of the negative (i.e., underexposed, optimum-exposed or overexposed negative) by correcting the density using the integral transmission density (LATD) of the entire image in the negative color film, and by performing slope control thereon. Such an automatic photographic color printing apparatus generally comprises a light source, a light adjusting filter, a mirror box, a negative carrier, and an optical system having a black shutter, which are aligned in the apparatus in that order. In order to print a negative color film, the negative color film supported by the negative carrier is irradiated by the light source, and the black shutter is opened for a predetermined period of time (the exposure time is made constant) so that the image in the negative color film is formed on a sheet of photographic paper. The photographic paper on which the image of the color negative has been formed is then automatically developed by a developing process so that it becomes a print copy. In the automatic photographic printing apparatus of this type, the light transmitted through the negative is broken down into primary colors including red light (R), green light (G), and blue light (B) by the light receiving element. The density of each primary color is controlled using the LATD on the basis of the Theorem of Evans, while the slopes of the three primary colors are controlled so as to be the same, so as to control the color balance.

With this automatic photographic printing apparatus, all a the prints exhibit the same levels of density and color balance, unless a change is caused in the conditions of the developing process.

However, if the major subject in the color negative has the optimum density but the density of its background is higher or lower, the density of the background affects the exposure, resulting in density failure. The difference in color balance between the major subject and the background, e.g., the complementary relationship between the colors of the major subject and the background, may produce color failure. In such a case, density correction or slope control will not ensure a print copy of excellent quality, and the negative must be printed and developed again.

To obviate this problem, Japanese Pat. Laid-Open (Kokai) No. 53-46731 a photographic inspection device provided with a simulator which is capable of displaying on a TV screen the image in a negative which is reproduced via a TV camera. In this device, the color video signals are adjusted such that the image displayed on the TV screen has a desired density and color balance, and these adjusted color signals are employed to print the negative in an automatic photographic printing apparatus. Further, in the automatic photographic apparatus disclosed in the specification of Japanese Pat. Publication No. 42-25220, the image in a negative which is to be printed on the photographic paper is displayed on a TV screen, and the automatic exposure device is coupled to the resistors for adjusting the brightness and contrast of the TV. In either case, the image is simulated so as to reduce the frequency with which reprinting redeveloping has to be resorted to.

The first method which employs the photographic printing apparatus, however, encounters a problem in that, since different light sources are used for the photographic inspection device and for the simulator for the automatic photographic printing apparatus, conditions such as the density and color balance of the image printed on a photographic paper by the automatic photographic printing apparatus in accordance with the data derived from the inspection device often differ from those displayed on the TV screen, due to, for example, fluctuations in the states of the light sources. On the other hand, the following problem is involved in the second apparatus in which the automatic exposure device is coupled to the resistors for àdjusting the brightness and contrast of the TV. Namely, since this arrangement merely controls the TV signal in such a way as to enable the TV screen to display the optimum image, despite the difference in the coloring characteristics as between the TV screen and the photographic paper, the image displayed on the TV screen is different in quality from that actually obtained on the photographic paper after the printing.

It is also to be pointed out that, the conventional apparatus requires that a negative/positive inversion be conducted for the purpose of attaining grey hue matching in the printing coloring characteristics, through effecting multiplication $b - \gamma$, after attaining hue matching between the negative image and the positive image. The hues are undesirably changed as a result of the negative/positive inversion, so that it is necessary to again conduct the hue matching operation. In consequence, a complicated operation is required to adjust the parameters which are necessary in attaining the hue matching.

SUMMARY OF THE INVENTION

Accordingly, an object of the present invention is to provide a simulator for an automatic photographic printing apparatus, capable of displaying automatically and accurately an image to be printed on a photographic paper with the same level of image quality, thereby overcoming the above-described problems of the prior art.

Another object of the present invention is to provide a simulator for an automatic photographic printing apparatus which is improved so as to facilitate setting parameters for attaining hue matching.

To these ends, according to one aspect of the present invention, there is provided a simulator for use in an automatic photographic printing apparatus of the type in which a negative image carried by a negative film is printed on a photographic paper by means of a light source system which undergoes light adjustment conducted by an automatic exposure control function, the simulator being adapted to display a positive image corresponding to the negative image in accordance with an output signal from an image pickup device which picks up the negative image on the negative film while the negative film is illuminated by the light source system and delivers an output signal corresponding to the negative image, the simulator comprising: an inversion circuit for inverting the output from the image pickup device so as to enable the positive image corresponding to the negative image to be produced; CRT means for displaying the positive image in accordance with the output from the inversion circuit; and a first conversion circuit connected to the input of the inversion circuit and a second conversion circuit connected to the output of the inversion circuit, the first conversion circuit and the second conversion circuit being adapted to effect a compensation for any difference between the integral density of the negative image as sensed with the spectral sensitivity of the image pickup device and the integral density of the negative image as sensed with the spectral sensitivity of the photographic paper, and also adapted for equalizing first tristimulus values according to the spectral emission spectral characteristics of the fluorescent substance on the CRT means and second tristimulus values according to dye absorption characteristics of the print.

Preferably, the arrangement is such that the first conversion circuit is adapted for converting the transmission density signal obtained by the image pickup device so as to effect compensation for any difference between the integral density of the negative image as sensed with the spectral sensitivity of the image pickup device and the integral density of the negative image as sensed with the spectral sensitivity of the photographic paper, while the second conversion circuit is adapted to convert the transmission density signal inverting by the inverted circuit, thereby equalizing first tristimulus values according to the spectral emission spectral characteristics of the fluorescent substance on the CRT means and second tristimulus values according to dye absorption characteristics of the photographic paper.

In operation, a negative color film is illuminated by a light source system the light from which is controlled by the automatic exposure function of the automatic photographic printing apparatus, and the negative image carried by the negative color film is picked up by the image pickup device. The signal corresponding to the negative image, derived from the image pickup device, is subjected to a logarithmic conversion so that a transmission density signal is obtained. Since the first conversion circuit and the second conversion circuit are connected to the input and output of the inversion circuit, the transmission density signal after conversion by the first conversion circuit is inverted by the inversion circuit so that a positive image corresponding to the negative image is produced. Then, in order to equalize the integral density of the negative image sensed with the spectral sensitivity of the image pickup device and the integral density of the negative image sensed with the spectral sensitivity of the photographic paper, the first and second conversion circuits conduct compensation for any difference between the integral densities. The first and the second conversion circuits also operate to equalize the tristimulus values according to the spectral emission characteristics of the fluorescent material on the CRT and the tristimulus values according to the dye absorption characteristics of the photographic paper. In consequence, the matching of colors is obtained between the image pickup device and the photographic paper and also between the CRT screen and the photographic paper. The arrangement may be such that the first conversion circuit is adapted to converting the transmission density signal so as to effect a compensation for any difference between the integral densities while the second conversion circuit is adapted for equalizing the tristimulus values according to the spectral emission characteristics of the fluorescent substance on the CRT means and the tristimulus values according to dye absorption characteristics of the photographic paper. Each of the first conversion circuit and the second conversion circuit may be constituted by a $3 \times 3$ matrix circuit which is adapted to conduct multiplying operation on an input signal with set values of the components of a cubic square matrix. Since the density and the color balance are adjusted by the automatic photographic printing apparatus, an image having the same colors as those of the print to be obtained is displayed on the CRT, without requiring any adjustment of the density or the color balance by the simulator, whereby an image exactly the same as the print image is obtained on the CRT.

Thus, according to the present invention, the negative image on the color negative film, illuminated by the light after adjustment by the automatic exposure function of the automatic photographic printing apparatus, is picked up and the positive image corresponding to the negative image is displayed on the CRT, and the positive image displayed on the CRT is formed by signals conforming with the coloring characteristics of the photographic paper. Therefore, the positive image displayed on the CRT is exactly the same as the image to be formed by printing on the photographic paper, so that the user can visually examine the printing image before printing is actually completed and, hence, can detect any inadequate condition for printing and development. It is also to be noted that the simulation can be conducted with a high level of accuracy because the operations for conforming the display image on the CRT with the print image are conducted at the input side and the output side of the inversion circuit.

These and other objects, features and advantages of the present invention will become clear from the following description of the preferred embodiment when the same is read in conjunction with the accompanying drawings.

BRIEF DESCRIPTION OF THE DRAWINGS

FIG. 2 is a circuit diagram illustrating an example of a gain control circuit appearing in the block diagram shown in FIG. 1;

FIG. 3 is a circuit diagram illustrating an example of a $\delta$ and $\gamma$ correction circuit appearing in the block diagram shown in FIG. 1;

DESCRIPTION OF THE PREFERRED EMBODIMENT

An embodiment of this invention will be described in detail below with reference to the accompanying drawings. This embodiment is a combination of an automatic photographic color printing apparatus (hereinafter referred to as a printer) and a device (hereinafter referred to as a simulator) for displaying an image in a negative color film in the state wherein it is formed in a print copy prepared by the printer.

Figure 1:
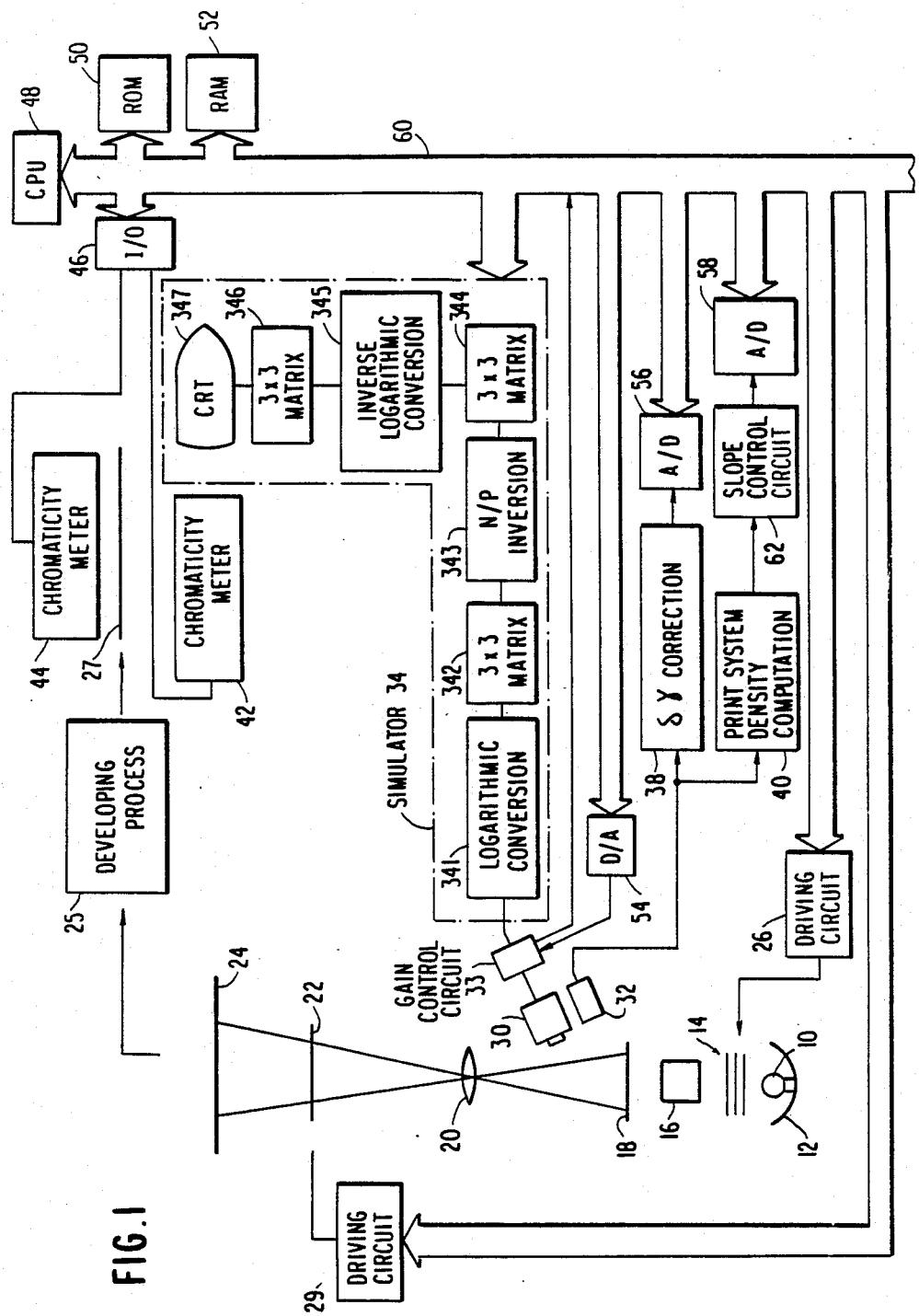
FIG. 1 is a block diagram of an embodiment of a simulator in accordance with the present invention.

As shown in FIG. 1, a reflecting mirror 12 comprising a cold mirror is disposed behind a light source 10 comprising a halogen lamp. A voltage of about 90% of the rated voltage is supplied to the light source 10 from a power source (not shown) so as to elongate the life thereof and to obtain a predetermined color temperature. At the light irradiated side of the light source 10 are disposed a light adjusting filter 14 and a mirror box 16 having a scattering board. The filter 14 consists of filters of the complementary colors of Y (yellow), M (magenta), and C (cyan). In each filter, a filter plate shaped as a sector of a quadrant which is formed in a logarithmic curve is combined with another filter, and that combination is disposed on right and left sides to make a pair. The color balance and amount of the light irradiated from the light source 10 are adjusted by the light adjusting filter 14, and that adjusted light is then diffused uniformly by the mirror box 16 to be irradiated onto a negative color film 18 supported on a negative carrier. To adjust the voltage of the light source, the filters of the complementary colors in the light adjusting filter are set at the mechanical center, the amount of light is set to a predetermined value (standard exposure time) by measuring it by an illuminometer, and the voltage of the light source is set at approximately 90% of the rated voltage. On the side of the negative color film 18 which is remote from the light source are disposed an optical system 20 and a black shutter 22 in that order. The black shutter 22 is opened for a predetermined time so that the image in the negative color film is formed on a photographic paper 24 and so that the photographic paper is exposed by the light transmitted through the negative color film 18. The exposed photographic paper 24 is then developed by a developing process 25 to obtain a print copy 27.

A driving circuit 26 is connected to the light adjusting filter 14. The driving circuit 26 moves the filters of the complementary colors in a direction perpendicular to the optical axis so as to adjust the color balance and the amount of light. A driving circuit 29 is connected to the black shutter 22.

Adjacent to the optical system 20 of the negative color film 18 are disposed a camera 30 and an image information detecting device 32. The camera 30 is constructed by a three-board camera provided with three filters which respectively transmit R (red) light, G (green) light, and B (blue) light as well as a stop mechanism (iris), and which outputs R, G, and B signals. The image information detecting device 32 includes a two-dimensional image sensor for detecting image density information on the three primary colors of r, g, and b. The two-dimensional image sensor is constructed by a CCD (charge coupled device). The camera 30 may be constructed by a CCD single-board camera.

In usual TV systems, the $\gamma$-value of the TV is set around 2.2. Therefore, in usual systems, a $\gamma$ correction circuit having a $\gamma$ value of $\gamma = 0.45$ is employed in the TV camera so as to obtain a final $\gamma$ value of $\gamma = 1$. Usual photographic paper has a $\gamma$ value of $\gamma = 2.0$. Therefore, according to the invention, no $\gamma$ correction circuit is employed in the camera 30 and the $\gamma$ value in the simulator is set approximately at 1.

The camera 30 is connected through a gain control circuit 33 to a simulator 34, while the image information detecting device 32 is connected to a slope control circuit 62 via a $\delta$ and $\gamma$ correction circuit 38 and a print system density computing circuit 40. The correction of the color balance and the correction of the density which are explained before are performed by the print system density computing circuit 40 and the slope control circuit 62. A chromaticity meter 42 is disposed such as to oppose the screen of a CRT 347 of the simulator 34. Another chromaticity meter 44 is positioned to face the image surface of the print 27. These chromaticity meters 42 and 44 are connected to an I/0 port 46 of a computer which has, in addition to the I/0 port 46, a CPU 48, a read only memory (ROM) 50, a random access memory (RAM) 52, a digital-to-analog (D/A) converter 54, analog-to-digital (A/D) converters 56, 58, and BUSes 60 including data BUSes and control BUSes interconnecting these constituent elements. The computer is connected to the gain control circuit 33, simulator 34, $\delta$ and $\gamma$ correction circuit 38, slope control circuit 62 connected to the print system density computing circuit 40, and the driving circuit 26. The computer also is connected to the driving circuit 29.

As will be understood from FIG. 2, the gain control circuit 33 includes an amplifier 331, an operation amplifier 332, a flip-flop 333 and resistors 334 to 336. One of the inputs of the operation amplifier 332 receives, through the resistor 336, a reference voltage which is 0.7 V corresponding to the white level. The gain of the camera 30 is adjusted by means of the gain control circuit 33 as follows:

A reference negative film (so-called blank negative film) obtained by developing unexposed film is supported on a negative film carrier. Brightness is adjusted to a reference value for the reference negative film. This adjustment of brightness is necessary because the amount of light received by the camera 30 is varied in accordance with changes in size of the reference negative film. It is to be noted that the adjustment of brightness is allowed to be conducted electrically, or if the camera 30 has/ a stop mechanism, or an, iris mechanism, the adjustment is allowed to be conducted by adjusting the stop mechanism . Subsequently, the blank negative film is photographed, or imaged, by the camera 30 and the gain of the amplifier 331 is adjusted by outputting analog signals from the D/A converter 54 in response to camera outputs for three primary colors, i.e., red (R), green (G) and blue (B). The output of the amplifier 331 is connected to the operational amplifier 332 which compares the output of the amplifier 331 with the reference voltage. The operational amplifier 332 outputs a signal to the flip-flop 333, only when the output of the amplifier 331 corresponds to the reference voltage. The output of the camera is set to the white level by stopping the adjustment of the gain when a signal is output from the flip-flop 333. Thus, the color balance can be adjusted with the output of the camera being set at the white level when the camera images the blank negative film (when the camera receives the maximum amount of light transmitted through the negative film). It is possible to easily and accurately determine the reference for the brightness. If the camera has the iris mechanism and the brightness is adjusted by the iris, the dynamic range of the camera can fully be used.

The adjustment of the gain described above can be conducted without difficulty by adjusting the brightness such that the level of any one of the primary color signals R, G and B, e.g., the G signal of intermediate wavelength, coincides with the white level and then adjusting the gain such that the levels of the remaining signals, e.g., the R and B signals, coincide with the white level.

It is possible to store (the iris position, if the camera has the iris mechanism and the iris is controlled so as to adjust the brightness, and) the color balance position of the camera after the gain control in the form of digital signals for each of a plurality of negative film sizes (if the size of the negative film is changed, the amount of light is varied by the difference in magnitude), and to set these data for the respective film sizes in different channels, so that the user can easily change the sensitivity to brightness simply by changing-over the channel. Namely, the camera can be automatically changed-over to provide optimum iris position (if the camera has the iris) and the color balance position, as the user changes the channel in conformity with the film size each time the film size is changed. In this system, if there is any offset of the state of the light source from the standard state, it is necessary to effect an electrical compensation for such an offset It is therefore desirable that the iris adjustment (if any) and the gain control are conducted while the light source is in such a state that the negative film of standard grey color is changed into a print of the standard grey color.

As will be seen from FIG. 3, the $\delta$ and $\gamma$ correction circuit 38 is composed of three signal processing circuits: namely, a signal processing circuit 60 for converting the R signal derived from the image information detecting device 32 into a density signal and then effecting a $\delta$ and $\gamma$ correction on the thus obtained density signal, a signal processing circuit 62 for converting the G signal derived from the image information detecting device 32 into a density signal and then effecting a $\delta$ and $\gamma$ correction on the thus obtained density signal, and a signal processing circuit 64 for converting the B signal derived from the image information detecting device 32 into a density signal and then effecting a $\delta$ and $\gamma$ correction on the thus obtained density signal. These signal processing circuits 60, 62 and 64 have a materially identical circuit arrangement, so that the signal processing circuit 60 will be detailed by way of example. The signal processing circuit 60 is constituted by an offset correction circuit 601, a logarithmic conversion circuit 602 for converting the color signal into density signal, a $\delta$ correction circuit 603 and a $\gamma$ correction circuit 604. The offset correction circuit 601 includes an operation amplifier OP3, resistors R6 and R7 and a variable power supply B1. The $\delta$ correction circuit 603 is composed of an operation amplifier OP4, resistors R8 and R9 and variable power supply B2 and circuit 604 includes operation amplifier OP5, resistors R10 and R11 and a variable resistor R12.

The simulator 34 has the following constituents which are connected in series in the mentioned order: a logarithmic conversion circuit 341 connected to the output end of the gain control circuit 33; a 3×3 matrix (cubic square matrix) circuit 342 serving as the first conversion circuit which effect compensation for difference between the density (integral density) on the basis of the spectral sensitivity of the camera and the density on the basis of the spectral sensitivity of the photographic paper; a Negative/positive conversion circuit 343 for effecting a negative/positive conversion to analytical density of the photographic paper; a 3×3 matrix circuit 344 for converting the analytical density into main dye absorption density of the photographic paper; an inverse logarithmic conversion circuit 345; 3×3 matrix circuit 346 for effecting conversion into luminance of the fluorescent substance on the CRT; and the CRT 347 for causing the fluorescent substance to generate colors in accordance with the outputs from the 3×3 matrix circuit 346 thereby to display the image picked up by the camera 30. The 3×3 matrix circuit 344, the inverse logarithmic conversion circuit 345 and the 3×3 matrix circuit 346 in combination constitute and serve as the second conversion circuit.

CORRECTION OF SPECTRAL SENSITIVITY OF RECEIVED LIGHT

The values obtained by logarithmically converting the B, G and R signals produced from the camera 30 by the logarithmic conversion circuit 341, i.e., the integral densities of the image in the negative color film viewed with the spectral sensitivity of the camera, $B'_{TV} G'_{TV}$ and $R'_{TV}$ are converted into the analytical densities of the negative by using 3×3 matrix A−1 (where −1 indicates an inverse matrix) as follows:

$$\begin{bmatrix} B_{TV} \\ G_{TV} \\ R_{TV} \end{bmatrix} = A^{-1} \begin{bmatrix} B'_{TV} \\ G'_{TV} \\ R'_{TV} \end{bmatrix} \tag{1}$$

The integral densities of the image in the negative color film viewed with the spectral sensitivity of the photographic paper, B'P', G'P',R'P' are converted into the analytical densities of the negative by using 3×3 matrix B−1, as follows:

$$\begin{bmatrix} B_p \\ G_p \\ R_p \end{bmatrix} = B^{-1} \begin{bmatrix} B'_p \\ G'_p \\ R'_p \end{bmatrix} \tag{2}$$

Since the analytical densities of the negative ($B_{TV}$, $G_{TV}$, $R_{TV}$) and ($B_P$, $G_P$, $R_P$), which are obtained by Expressions (1) and (2), are proportional, they can be expressed by the following Expression (3), using the diagonal matrix $\alpha$ whose diagonal elements proportional constants:

$$\begin{bmatrix} B_p \\ G_p \\ R_p \end{bmatrix} = \begin{bmatrix} \alpha_B & 0 & 0 \\ 0 & \alpha_G & 0 \\ 0 & 0 & \alpha_R \end{bmatrix} \begin{bmatrix} B_{TV} \\ G_{TV} \\ R_{TV} \end{bmatrix} \tag{3}$$

Using Expressions (1) to (3), the relationship between ($B'_P$, $G'_P$, $R'_P$) and ($B'_{TV}$, $G'_{TV}$, $R'_{TV}$) is expressed as shown below, whereby the difference between the densities viewed with the spectral sensitivity of the TV and that of the photographic paper can be corrected, i.e., the density viewed with the spectral sensitivity of the TV is converted to the density viewed with the spectral sensitivity of the photographic paper.

$$\begin{bmatrix} B'_p \\ G'_p \\ R'_p \end{bmatrix} = B\alpha A^{-1} \begin{bmatrix} B'_{TV} \\ G'_{TV} \\ R'_{TV} \end{bmatrix} \tag{4}$$

where

-continued $$\alpha = \begin{bmatrix} \alpha_B & 0 & 0 \\ 0 & \alpha_G & 0 \\ 0 & 0 & \alpha_R \end{bmatrix}$$

The matrix elements, B, $\alpha$ and A, can be obtained beforehand for each standard negative sample with the coloring characteristics of that negative and the spectral sensitivity characteristics of the photographic paper and camera taken into consideration, and is set in the 3×3 matrix circuit 342.

$$B \cdot \alpha \cdot A^{-1} = \begin{bmatrix} K_{11} & K_{12} & K_{13} \\ K_{21} & K_{22} & K_{23} \\ K_{31} & K_{32} & K_{33} \end{bmatrix} \quad (5)$$

NEGATIVE/POSITIVE INVERSION

Figure 4:
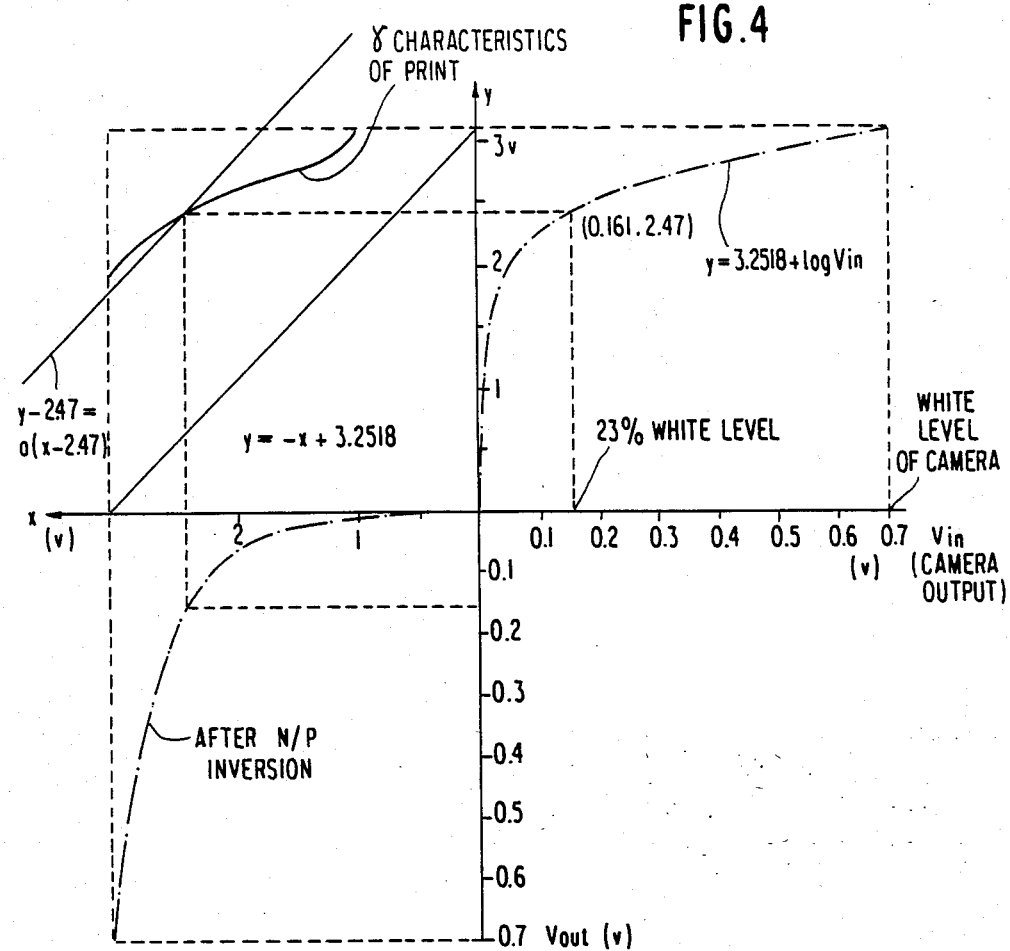
FIG. 4 is a diagram explanatory of a Negative/positive inversion.

The Negative/positive inversion circuit 343 is a circuit which converts $\gamma$ into $-\gamma$. It converts the output of the 3×3 matrix circuit with respect to the following straight line which is approximate to a curve line for showing characteristic of the print shown in FIG. 4.:

$$Y - Y_1 = a(X - X_1) \quad (6)$$

where $X_1$, $Y_1$ are the coordinates of a point which is not affected by the Negative/positive inversion (hereinafter referred to as a pivot point), x,y are the coordinates of the density region in term of x-y coordinates, and a represents a constant value which is usually a negative value. In usual cameras and CRTs, all the brightness levels between the black level and the white level are represented by voltage values ranging between 0 and 0.7V. Therefore, logarithmic conversion of the image signal, particularly the black level 0, produces $-\infty$. This means that the black level cannot always be converted exactly into white level. It is, therefore, advisable to use a point near 23% of the white level of the camera output $V_{in}$ (0.63 in terms of the density of the negative excluding the base portion), as the pivot point for the Negative/positive inversion. FIG. 4 shows the relationship between the camera output $V_{in}$ and the output $V_{out}$ of the negative/positive inversion circuit 343 at negative/positive inversion with the pivot point set to 23% of the white level of the camera output $V_{in}$. The white level of the camera output is 0.7 V, and 23% of the white level is therefore 0.161 V. When the output of the 3×3 matrix circuit 342 is expressed by the following expression:

$$y = 3.2518 + \log V_{in} \quad (7)$$

the coordinates corresponding to 23% of the white level is (0.161, 2.47). When the curve expressed by Expression (7) is transformed in accordance with the straight line which passes through the point (2.47, 2.47) and which is expressed by:

$$y - 2.47 = a(x - 2.47) \quad (8)$$

the output of the 3×3 matrix circuit 342 is subjected to negative/positive inversion, as shown by the curve in FIG. 4. As can be seen from FIG. 4, the value which is 23% of the white level of the camera output remains the same after the negative/positive inversion.

Figure 5:
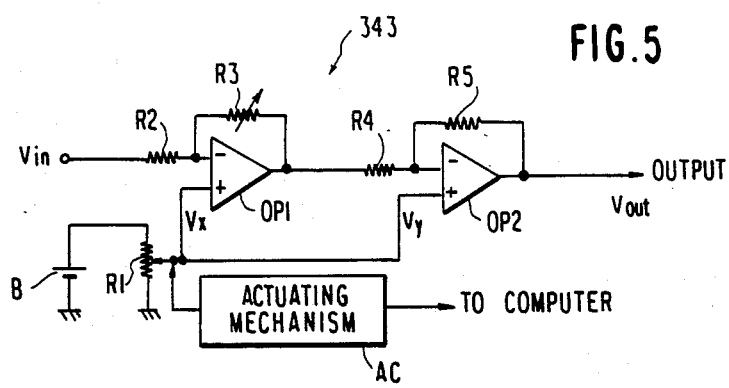
FIG. 5 is a circuit diagram of an example of the circuit diagram for conducting the Negative/positive inversion.

The negative/positive inversion may be performed with the circuit constructed shown in FIG. 5 and with a pivot point obtained in a manner described below. The circuit shown in FIG. 5 includes an operational amplifier OP1, an operational amplifier OP2, a variable resistor R1 used to set the reference voltage $V_x$, $V_y$ (which corresponds to the pivot point) of the operational amplifiers, and an operation mechanism AC which varies the reference voltage by moving the contact of the variable resistor R1. A signal is input to the inversion input of the operational amplifier OP1 through a resistor R2, and a variable resistor R3 is connected between the inversion input of the operational amplifier OP1 and its output so as to adjust the gain thereof. The output of the operational amplifier OP1 is connected to the inversion input of the operational amplifier OP2 through a resistor R4. A resistor R5 is connected between the inversion input of the operational amplifier OP2 and its output. One of the leads of the variable resistor R1 is grounded, and the other lead thereof is grounded through a power source. B. The contact of the variable resistor R1 is respectively connected to the non-inversion inputs of the operational amplifiers OP1, OP2.

Using the thus-arranged circuit, the pivot point will be obtained as follows: the negative color film which is colored in standard grey is supported on the negative carrier. The negative is imaged by the camera, and is displayed on the screen on the CRT after it has been negative/positive inverted by the circuit shown in FIG. 5. Next, a standard grey signal is electrically produced (by setting the output of the CRT at a value which is 23% of the white level of the CRT), and that signal is displayed on the CRT screen adjacent to the image in the above negative. The reference voltage, $V_x$, $V_y$, is then varied by changing the resistance of the variable resistor R1 continuously by the operation of the key board so as to match the image displayed by imaging the negative which is colored in the standard grey and the image reproduced by the electrically produced standard greysignal. The pivot point is thereby determined.

When the above described circuit is used, grey level can be set by the sense of an operator. Accordingly, it is possible to set the grey level which is to be provided on a print copy. This enables a very accurate simulation which is not affected by the developing conditions (such as the fatigue of the developer, change in the quality of the developer due to the change in temperature).

CORRECTION OF COLORING SPECTRAL SENSITIVITY CHARACTERISTICS

Since the CRT employs illuminant substances to display images, the luminance of the CRT is proportional to the voltage. On the other hand, the photographic paper (the print copy) employs absorbing substances (dyes), so that the amount of dyes is not proportional to luminance but is proportional to the logarithm of luminance, In addition, the chromaticity point is changed by a change in the amount of the dyes. According to the invention, therefore, coincidence is obtained between the coloring characteristics offered by the dyes of the print and the coloring characteristics offered by the luminescent material of the CRT, by the operation of the 3×3 matrix circuit 344, inverse logarithmic conversion circuit 345 and the 3×3 matrix circuit 346. As explained before, the dyes oil the print exhibit unstable primary colors C, Y, M which change chromaticity point according to change in the amounts of the dyes. In the following description, therefore, the primary colors will be discussed by approximating them by block dyes with sub-absorption.

The wavelengths of the light rays reflected from the print are divided into three regions: namely, a G region covering the wavelengths of 380 to $\lambda_1$ nm, a B region covering the wavelengths of $\lambda_1$ to $\lambda_2$ nm and an R region covering the wavelengths of $\lambda_2$ to 780 nm. In such a case, the spectral transmittances $T_R$, $T_G$ and $T_B$ of the respective regions R, G and B, taking into the sub-absorption account, are represented as follows.

$$T_R = TC_R \times TM_R \times TY_R \quad (9)$$

$$T_G = TC_G \times TM_G \times TY_G \quad (10)$$

$$T_B = TC_B \times TM_B \times TY_B \quad (11)$$

In the right sides of the formulae (9) to (11), T represents the transmittance, while C, M and Y represent complementary colors of R, G and B, respectively. Suffixes R, G and B represent, respectively, the three regions of the wavelengths mentioned above.

The following formulae are derived by converting the transmittance values of the formulae (9), (10) and (11) into density values.

$$D_R = DC_R + DM_R + DY_R \quad (12)$$

$$D_G = DC_G + DM_G + DY_G \quad (13)$$

$$D_B = DC_B + DM_B = DY_B \quad (14)$$

The following formulae (15) to (17) are obtained by representing the sub-absorptions of the formulae (12) to (14) as the functions of the main absorptions $DC_R$, $DM_G$, $DY_B$.

$$DR = DCR + DMR(DMG) + DYR(DYB) \quad (15)$$

$$D_G = DC_G(DC_R) + DM_G + DY_G(DY_B) \quad (16)$$

$$D_B = DC_B(DC_R) + DM_B(DM_G) + DY_B \quad (17)$$

Assuming here that the formulae (15) to (17) follow the Beer's law, these formulae can be expressed by a 3×3 matrix as the following formula (18).

$$\begin{bmatrix} D_R \\ D_G \\ D_B \end{bmatrix} = \begin{bmatrix} 1 & KM_R & KY_R \\ KC_G & 1 & KY_G \\ KC_B & KM_B & 1 \end{bmatrix} \begin{bmatrix} DC_R \\ DM_G \\ DY_B \end{bmatrix} \quad (18)$$

The output after the inversion by the negative/positive inversion circuit 343 represents the analytic density corresponding to the amounts of dyes in the print. The matrix of the formula (18), therefore, can be converted into approximating integral density of only the main absorption, by setting a matrix shown by the following formula (19) in the 3×3 matrix circuit 344.

$$D = \begin{bmatrix} 1 & KM_R & KY_R \\ KC_G & 1 & KY_G \\ KC_B & KM_B & 1 \end{bmatrix} \quad (19)$$

On the other hand, the tristimulus values X, Y and Z are given by the following formula (20). (Only stimulus value X is shown)

$$X = \frac{\int_{380}^{780} E\lambda \tau\lambda \bar{x}\lambda \, d\lambda}{\int E\lambda \bar{y}\lambda \, d\lambda} = \frac{\int_{\lambda_2}^{780} E\lambda T_R \bar{x}\lambda \, d\lambda}{\int E\lambda \bar{y}\lambda \, d\lambda} +$$

$$\frac{\int_{\lambda_1}^{\lambda_2} E\lambda T_G \bar{x}\lambda \, d\lambda}{\int E\lambda \bar{y}\lambda \, d\lambda} + \frac{\int_{380}^{\lambda_1} E\lambda T_B \bar{x}\lambda \, d\lambda}{\int E\lambda \bar{y}\lambda \, d\lambda} =$$

$$T_R \frac{\int_{\lambda_2}^{780} E\lambda \bar{x}\lambda \, d\lambda}{\int E\lambda \bar{y}\lambda \, d\lambda} + T_G \frac{\int_{\lambda_1}^{\lambda_2} E\lambda \bar{x}\lambda \, d\lambda}{\int E\lambda \bar{y}\lambda \, d\lambda} +$$

$$T_B \frac{\int_{380}^{\lambda_1} E\lambda \bar{x}\lambda \, d\lambda}{\int E\lambda \bar{y}\lambda \, d\lambda} = T_R X_R + T_G X_G + T_B X_B \quad (20)$$

where, $E\lambda$ represents the spectral radiation flux of the illuminating light, $\tau\lambda$ represents the spectral reflectivity of the object, $\bar{x}\lambda$ represents the red stimulus value and $\bar{y}\lambda$ represents the red stimulus value. The following formula (21) is obtained by representing the above tristimulus values in the form of a matrix.

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \begin{bmatrix} T_R \\ T_G \\ T_B \end{bmatrix} \quad (21)$$

where, $T_R$, $T_G$ and $T_B$ represent the integral transmittances, and X,Y and Z with suffixes indicate stimulus values of colors represented by the suffixes.

The relationship between the luminance signals ($T_R'$, $T_G'$, $T_B'$) and the tristimulus values (X', Y', Z') is represented by the following formula (22), in the same way as above.

$$\begin{bmatrix} X' \\ Y' \\ Z' \end{bmatrix} = \begin{bmatrix} X_R' & X_G' & X_B' \\ Y_R' & Y_G' & Y_B' \\ Z_R' & Z_G' & Z_B' \end{bmatrix} \begin{bmatrix} T_R' \\ T_G' \\ T_B' \end{bmatrix} \quad (22)$$

Assuming here that the condition of $$\begin{bmatrix} X' \\ Y' \\ Z' \end{bmatrix} = \begin{bmatrix} X \\ Y \\ Z \end{bmatrix}$$

is met, the following condition is obtained.

$$\begin{bmatrix} X_R' & X_G' & X_B' \\ Y_R' & Y_G' & Y_B' \\ Z_R' & Z_G' & Z_B' \end{bmatrix} \begin{bmatrix} T_R' \\ T_G' \\ T_B' \end{bmatrix} = \quad (23)$$

-continued $$\begin{bmatrix} X_R & X_G & X_B \\ Y_R & Y_G & Y_B \\ Z_R & Z_G & Z_B \end{bmatrix} \begin{bmatrix} T_R \\ T_G \\ T_B \end{bmatrix}$$

From the formula (23) above, it is possible to obtain the luminance signal of the CRT, i.e., the command signal, as follows.

$$\begin{bmatrix} T_R' \\ T_G' \\ T_B' \end{bmatrix} = \begin{bmatrix} X_{R'} & X_{G'} & X_{B'} \\ Y_{R'} & Y_{G'} & Y_{B'} \\ Z_{R'} & Z_{G'} & Z_{B'} \end{bmatrix}^{-1} \times \begin{bmatrix} X_R & X_G & X_B \\ Y_R & Y_G & Y_B \\ Z_R & Z_G & Z_B \end{bmatrix} \begin{bmatrix} T_R \\ T_G \\ T_B \end{bmatrix} \quad (24)$$

Therefore, by setting the following matrix in the above-mentioned 3×3 matrix circuit 346, it is possible to determine luminances of the fluorescent substance for the respective colors, so that the luminescent material of the CRT emits lights in accordance with the thus obtained luminance signals.

$$T = \begin{bmatrix} X_{R'} & X_{G'} & X_{B'} \\ Y_{R'} & Y_{G'} & Y_{B'} \\ Z_{R'} & Z_{G'} & Z_{B'} \end{bmatrix}^{-1} \begin{bmatrix} X_R & X_G & X_B \\ Y_R & Y_G & Y_B \\ Z_R & Z_G & Z_B \end{bmatrix} \quad (25)$$

The term $$\begin{bmatrix} X_R & X_G & X_B \\ Y_R & Y_G & Y_B \\ Z_R & Z_G & Z_B \end{bmatrix} \begin{bmatrix} T_R \\ T_G \\ T_B \end{bmatrix}$$

appearing in formula (24) equals to the tristimulus values of the photographic paper, as will be seen from formula (21) and, therefore, can be determined by measuring the chromaticity points of the finished print by means of the chromaticity meter 44.

The components of the inverse matrix of the formula (24) are determined by measuring the tristimulus values of the CRT by means of the chromaticity meter 42.

Namely, the values $X_R'$, $Y_R'$ and $Z_R'$ are determined by setting a condition of $T_G' = T_B' = 0$, while setting $T_R'$ at a predetermined voltage level. Similarly, the values $X_G'$, $Y_G'$ and $Z_G'$ are determined by setting a condition of $T_R' = T_B' = 0$, while setting $T_G'$ at a predetermined voltage level, and the values $X_B'$, $Y_B'$ and $Z_B'$ are determined by setting a condition of $T_R' = T_G' = 0$, while setting $T_B'$ at a predetermined voltage level. It is thus possible to determine, using the formula (24), the signals to be delivered to the CRT, i.e., the command values.

The components of D and T of the matrixes shown by the formulae (19) and (25) show, respectively, the representative values $f_3$ and $f_4$ which meet the condition of the following formula (26), representing the input of the 3×3 matrix circuit 344 by $\overline{D}$ and the output of the 3×3 matrix circuit 346 by $\overline{T}$.

$$\overline{T} = f_4[\log^{-1} f_3(\overline{D})] \quad (26)$$

where, $\overline{D}$ is the output from the negative/positive inversion circuit, computed as explained above by multiplying the printing density by $-\gamma$, while T represents the values ($T_R'$, $T_G'$, $T_B'$) determined as above. The input and the output of the formula (26) are thus components of the matrix circuits 344 and 346, through conducting optimization by minimum square method or recurrence.

In the above embodiment the conversion means is constituted by the 3×3 matrix circuit, but in the present invention it can be constituted by operation effected by a computer.

As will be understood from the foregoing description, according to the invention, the negative/positive inversion is conducted after the correction of the spectral characteristics of the received light.

What is claimed is:

1. A simulator for use in an automatic photographic printing apparatus of the type in which a photographic paper is exposed to a negative image carried by a negative film by means of a light source system controlled by an automatic exposure control function of the automatic photographic printing apparatus, said simulator being adapted to display a positive image corresponding to said negative image in accordance with an output signal from an image pickup device which picks up said negative image when said negative film is illuminated by said light source system, said simulator comprising:
   first conversion means receiving said output signal from said image pickup device;
   inversion means coupled to an output from said first conversion means;
   second conversion means coupled to an output from said inversion means; and
   display means coupled to an output from said second conversion means;
   said inversion means inverting said output from said first conversion means so as to produce a positive image corresponding to said negative image;
   said display means displaying a compensated positive image in accordance with the output from said second conversion means; and
   said first conversion means and said second conversion means together effecting compensation for any difference between an integrated density of said negative image relative to the spectral sensitivity of said image pickup device and an integrated density of said negative image relative to the spectral sensitivity of said photographic paper, and substantially equalizing first tristimulus values associated with spectral emission characteristics of a fluorescent substance on said display means with second tristimulus values associated with dye absorption characteristics of a print obtained from the photographic paper.

2. A simulator for use in an automatic photographic printing apparatus according to claim 1, wherein said first conversion means is adapted for effecting said compensation for said any difference while said second conversion means is adapted for substantially equalizing said first tristimulus values with said second tristimulus values.

3. A simulator for use in an automatic photographic printing apparatus according to claim 2, wherein each of said first conversion means and said second conversion means includes 3×3 matrix means which employs cubic square matrix components as parameters for effecting said compensation for said any difference and for equalizing said tristimulus values.

4. A simulator for use in an automatic photographic printing apparatus according to claim 2, further comprising a logarithmic conversion means for conducting a logarithmic conversion of said output signal from said image pickup device so as to deliver a transmission density signal to said first conversion means.

5. A simulator for use in an automatic photographic printing apparatus according to claim 1, wherein said inversion means is adapted for conducting a negative/positive inversion of the output from said first conversion means into an analytical density of said photographic paper.

6. A simulator for use in an automatic photographic printing apparatus according to claim 5, wherein said second conversion means includes first 3×3 matrix means, inverse logarithmic conversion means and second 3×3 matrix means which are connected in series between the output of said negative/positive inversion means and an input of said display means.

7. A simulator for use in an automatic photographic printing apparatus according to claim 1, further comprising logarithmic conversion means for converting an output of said image pickup device into a transmission density signal and for supplying the transmission density signal to the first conversion means as the output signal of the image pickup device, said inversion means being adapted for converting said transmission density signal, as converted by said first conversion means, into an analytical density signal corresponding to an amount of dyes of a print obtained from the photographic paper using the negative image.

8. A simulator for use in an automatic photographic apparatus according to claim 7, wherein said second conversion means includes third conversion means for converting the analytical density signal from said inversion means into a main dye absorption density signal of the photographic paper, an inverse logarithmic conversion means for conducting an inverse logarithmic conversion of the main dye absorption density signal from said third conversion means so as to form a signal corresponding to transmittance, and forth conversion means for converting the signal corresponding to transmittance into a luminance signal of said display means and for supplying the luminance signal to the display means as the output of the second conversion means.

9. A simulator for use in an automatic photographic printing apparatus according to claim 8, wherein each of said third conversion means and said fourth conversion means includes 3×3 matrix means which employs cubic square matrix components as parameters for converting said analytical density signal into the main dye absorption density signal of said paper and for converting the signal corresponding to transmittance into the luminance signal.

10. A simulator for use in an automatic photographic printing apparatus according to claim 1, wherein said inversion means inverts said output signal from said image pickup device, as converted by the first conversion means, with a characteristic which is substantially the same as a characteristic of said photographic paper for obtaining said positive image which corresponds to said negative image.

11. A simulator for use in an automatic photographic printing apparatus according to claim 10, wherein said characteristic of said photographic paper is a γ characteristic which represents a relationship between a common logarithm of exposure and density of the photographic paper.

12. A simulator for use in an automatic photographic printing apparatus of the type in which a photographic paper is exposed to a negative image carried by a negative film by means of a light source system controlled by an automatic exposure control function of the automatic photographic printing apparatus, said simulator including display means and being adapted to display a positive image corresponding to said negative image in accordance with a transmission density signal derived from an output of an image pickup device which picks up said negative image when said negative film is illuminated by said light source system, said simulator comprising:

inversion means receiving said transmission density signal;

first conversion means coupled to an output of said inversion means;

inverse logarithmic conversion means coupled to an output of said first conversion means; and second conversion means coupled to an output of said inverse logarithmic conversion means;

said inversion means converting said transmission density signal into an analytical density signal corresponding to an amount of dyes of a print obtained from the photographic paper using said negative image supplying the analytical density signal to the first conversion means as the output of the inversion means;

said inverse logarithmic conversion means conducting an inverse logarithmic conversion upon the output of said first conversion means, to convert said output into a signal corresponding to transmittance and to supply the signal corresponding to transmittance to the second conversion means as the output of the inverse logarithmic conversion means; and said first conversion means and said second conversion means together converting said transmission density signal as inverted by said inversion means so as to correspond only to main absorption of said dyes, and converting said signal corresponding to transmittance into a luminance signal of said display means.

13. A simulator for use in an automatic photographic printing apparatus according to claim 12, wherein said first conversion means is constituted so as to convert said transmission density signal as inverted by the inversion means so as to correspond only to the main absorption of the dyes, while said second conversion means is constituted so as to convert the signal corresponding to transmittance into the luminance signal of said display means.

14. A simulator for use in an automatic photographic printing apparatus according to claim 13, wherein each of said first conversion means and said second conversion means includes 3×3 matrix means which employs cubic square matrix components as parameters for converting said transmission density signal as inverted by said inversion means, and for converting said signal corresponding to transmittance into the luminance signal of said display means.

15. A simulator for use in an automatic photographic printing apparatus according to claim 13, further comprising a logarithmic conversion means for effecting a logarithmic conversion of the output from said image pickup device to output said transmission density signal to the inversion means.

16. A simulator for use in an automatic photographic printing apparatus according to claim 14, further comprising third conversion means which receives the transmission density signal from said logarithmic conversion means, said third conversion means is constituted so as to effect a compensation of the transmission density signal for any difference between an integrated density of said negative image relative to the spectral sensitivity of said image pickup device and an integrated density of said negative image relative to the spectral sensitivity of said photographic paper and to output the compensated transmission density signal to the inversion means.

17. A simulator for use in an automatic photographic printing apparatus according to claim 16, wherein said third conversion means comprises 3×3 matrix means which employs cubic square matrix components as parameters for effecting said compensation.

18. A simulator for use in an automatic photographic printing apparatus with an automatic exposure control function in which a color negative film is illuminated by a light source system controlled by said automatic exposure control function and a negative image recorded on said negative film is printed as a positive image on photographic color paper, said simulator comprising:
- an image pickup device for picking up said negative image illuminated by said light source system;
- a logarithmic conversion circuit for converting an output signal obtained by said image pickup device into a density signal;
- a first conversion circuit for compensating for any difference between an integrated density of said negative image relative to the spectral sensitivity of said image pickup device and an integrated density of said negative image relative to the spectral sensitivity of said photographic color paper;
- an inversion circuit for inverting an output of said first conversion circuit with substantially a same characteristic as a characteristic of said photographic color paper, and for converting it into an analytical density signal corresponding to an amount of dyes of a print obtained from said photographic color paper using the negative image;
- a second conversion circuit for converting said analytical density signal into an integral density signal corresponding to main absorption of the dyes;
- an inverse logarithmic conversion circuit for converting said integral density signal into an integral transmittance signal; and
- a third conversion circuit for converting said integral transmittance signal by primary color conversion into a luminance signal for a fluorescent substance of a CRT;
- said CRT being operable for displaying a positive image corresponding to said negative image on the basis of said luminance signal.

* * * * *